(12) United States Patent
Werner

(10) Patent No.: US 7,819,463 B2
(45) Date of Patent: Oct. 26, 2010

(54) TRUCK BOX SPACE FRAME

(75) Inventor: Mark F. Werner, LaSalle (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/628,608

(22) Filed: Dec. 1, 2009

(65) Prior Publication Data

US 2010/0072781 A1   Mar. 25, 2010

Related U.S. Application Data

(62) Division of application No. 11/743,171, filed on May 2, 2007, now Pat. No. 7,665,800.

(60) Provisional application No. 60/801,239, filed on May 16, 2006.

(51) Int. Cl.
B62D 21/02 (2006.01)

(52) U.S. Cl. ................. 296/184.1; 296/183.1; 296/204; 296/29; 296/30

(58) Field of Classification Search .............. 296/184.1, 296/29, 30, 183.1, 204
See application file for complete search history.

(56) References Cited

U.S. PATENT DOCUMENTS

| 3,330,574 | A | | 7/1967 | Kulyk |
| 4,526,418 | A | * | 7/1985 | Martin .................... 296/184.1 |
| 5,979,973 | A | | 11/1999 | Clare et al. |
| 6,036,258 | A | | 3/2000 | Clare et al. |
| 6,142,549 | A | | 11/2000 | Clare et al. |
| 6,237,211 | B1 | | 5/2001 | Clare et al. |
| 6,702,365 | B2 | * | 3/2004 | Semple et al. ........... 296/183.1 |
| 6,746,040 | B2 | | 6/2004 | Bordeleau et al. |
| 6,805,379 | B2 | | 10/2004 | Nommensen |
| 6,814,397 | B2 | | 11/2004 | Henderson et al. |
| 7,152,911 | B1 | | 12/2006 | McNulty et al. |
| 7,322,640 | B2 | | 1/2008 | Ni et al. |
| 2003/0047964 | A1 | | 3/2003 | Jurica et al. |
| 2005/0134095 | A1 | | 6/2005 | Mayer et al. |
| 2005/0225120 | A1 | | 10/2005 | Womack et al. |
| 2006/0076804 | A1 | | 4/2006 | Ni et al. |

* cited by examiner

Primary Examiner—Joseph D Pape
(74) Attorney, Agent, or Firm—Harness, Dickey & Pierce, P.L.C

(57) ABSTRACT

A truck box frame includes first and second laterally extending frame members and a frame side rail assembly. The frame side rail assembly includes first and second frame side rails. The first and second frame side rails generally extend between and are coupled to the first and second laterally extending frame members. The first and second laterally extending frame members are extendable laterally, creating a variable width truck box frame. The first and second frame side rails may be curved or swept so that the intermediate portions extend inwardly toward one another, forming a tapered portion of the frame side rail assembly. The length and curvature, or sweep, of the side frame rails may also be varied to create a variable length truck box frame.

5 Claims, 9 Drawing Sheets

TRUCK BOX SPACE FRAME

This application is a Divisional Application of U.S. application Ser. No. 11/743,171 filed on May 2, 2007 now U.S. Pat. No. 7,665,800 which claims the benefit of U.S. Provisional Application Ser. No. 60/801,239 filed on May 16, 2006.

FIELD

The present disclosure relates to a motor vehicle cargo bed and, more specifically, to a space frame for the cargo bed of a pickup truck.

BACKGROUND

The statements in this section merely provide background information related to the present disclosure and may not constitute prior art.

Traditional truck boxes are typically formed as an integral unibody construction that relies on the box side material and construction to achieve overall structural performance. To achieve cost and weight reduction targets as well as accommodate design options such as box inner panels having storage compartments, plastic is becoming a desired alternative material to the traditional metal used for inner portions of truck beds. Substituting plastic for steel reduces box stiffness and results in higher stress magnitudes in the truck box floor, cross-members, pillars, and stringers.

New truck designers also wish to have increased design flexibility regarding the materials used to form the outer box panels as well. A box design that accommodates dimensional variants in truck box size with low impact on tooling and investment cost may also be beneficial. Accordingly, It is desirable to have a truck box design that minimizes the contribution of the box side material and construction to overall structural performance. These efforts allow for substitution of alternative box geometries and materials that provide less stiffness than the traditional metal boxes. This results in greater flexibility in truck box design, as well as lower cost.

SUMMARY

A truck box frame includes first and second laterally extending frame members and a frame side rail assembly. The frame side rail assembly includes first and second frame side rails. The first and second frame side rails generally extend between and are coupled to the first and second laterally extending frame members. The first and second laterally extending frame members are extendable laterally, creating a variable width truck box frame. The first and second frame side rails may be curved or swept so that the intermediate portions extend inwardly toward one another, forming a tapered portion of the frame side rail assembly. The length and curvature, or sweep, of the side frame rails may also be varied to create a variable length truck box frame.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
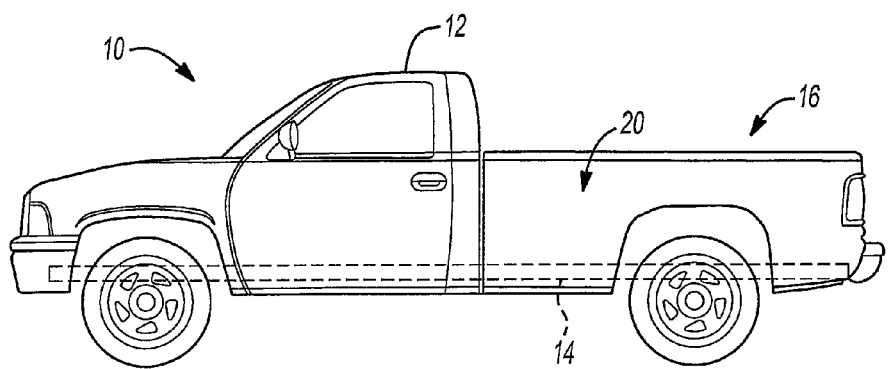
FIG. 1 is a side plan view of a motor vehicle including a truck box assembly according to the present teachings.
Figure 2:
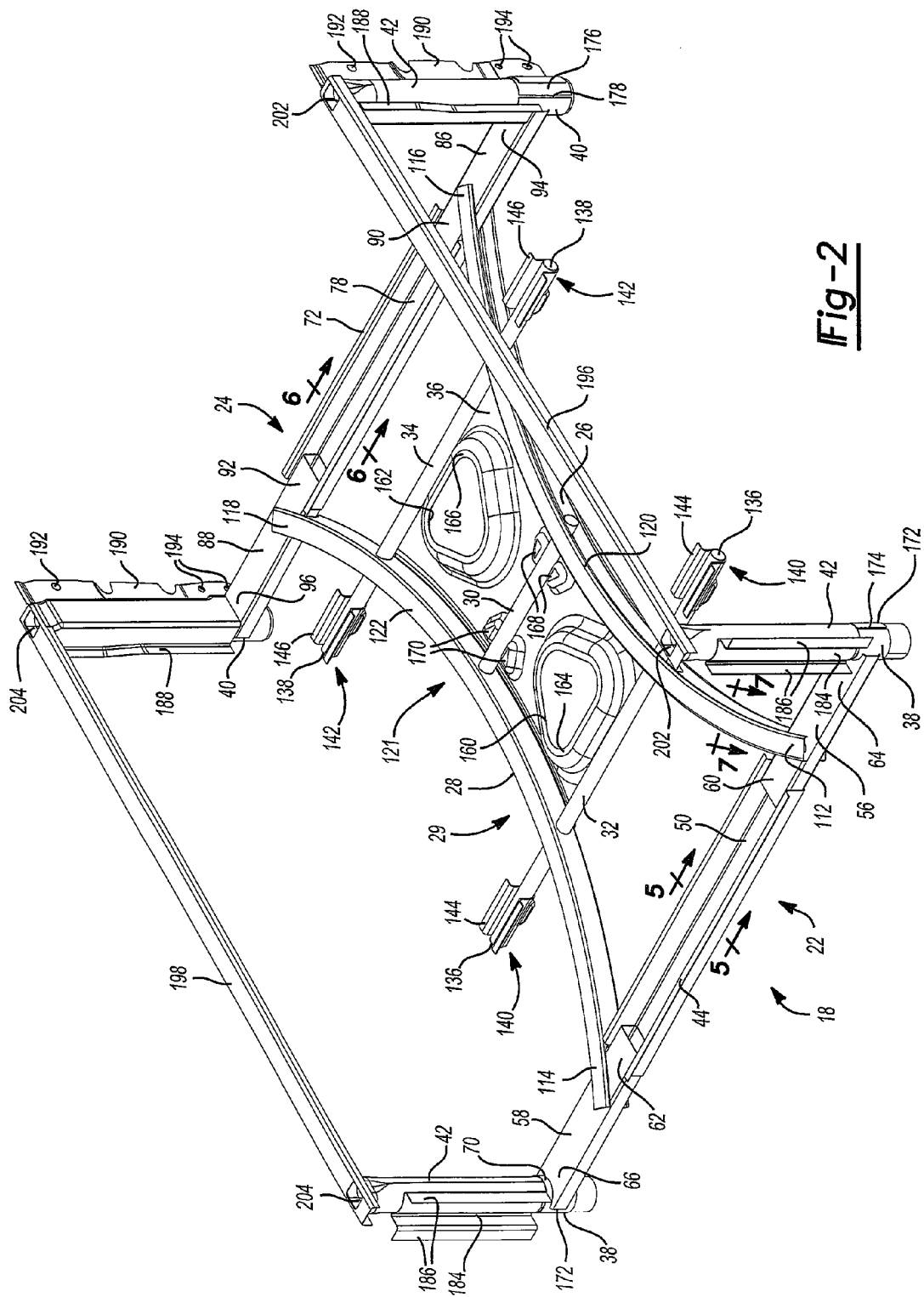
FIG. 2 is a perspective view of a truck box frame according to the present teachings.
Figure 3:
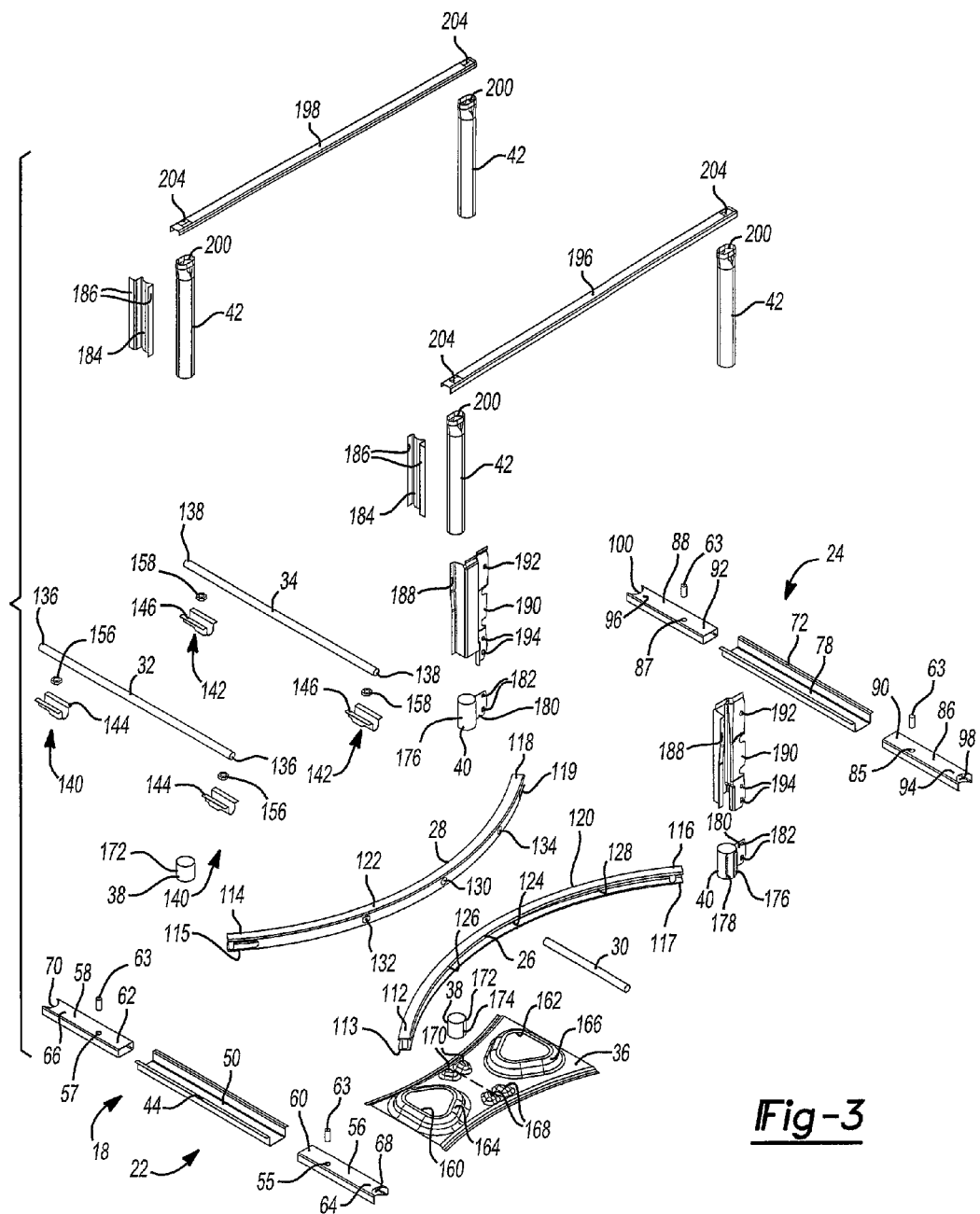
FIG. 3 is an exploded perspective view of the truck box frame of FIG. 2.

With reference to FIG. 1, a motor vehicle 10 is shown including a cab 12, a truck frame 14, and a truck box assembly 16. Cab 12 and truck box assembly 16 may be mounted to truck frame 14. With additional reference to FIGS. 2 and 3, truck box assembly 16 may include a truck box frame 18 and a truck box body 20. Truck box frame 18 may be a spaceframe and may include laterally extending front and rear frame members 22, 24, a pair of frame side rails 26, 28, a center cross-member 30, front and rear cross-members 32, 34, a reinforcement panel 36, sleeve members 38, 40, and pillars 42.

Figure 5:
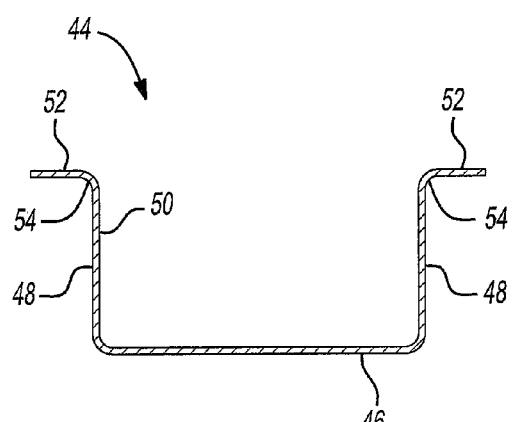
FIG. 5 is a sectional view taken at line 5-5 shown in FIG. 2.

Front frame member 22 may be rollformed and may extend along a width of a front portion of truck box body 20. Front frame member 22 may include a front sill floor 44 having a cross-section, shown in FIG. 5, including a base 46 with upwardly extending wall members 48, forming a channel 50. Wall members 48 may include flanged upper portions 52 extending from free ends 54. Flanged upper portions 52 may be generally parallel to base 46 and may be spot welded to truck box floor 236 (shown in FIG. 13). Front sill floor 44 may form a central portion of front frame member 22.

Figure 4:
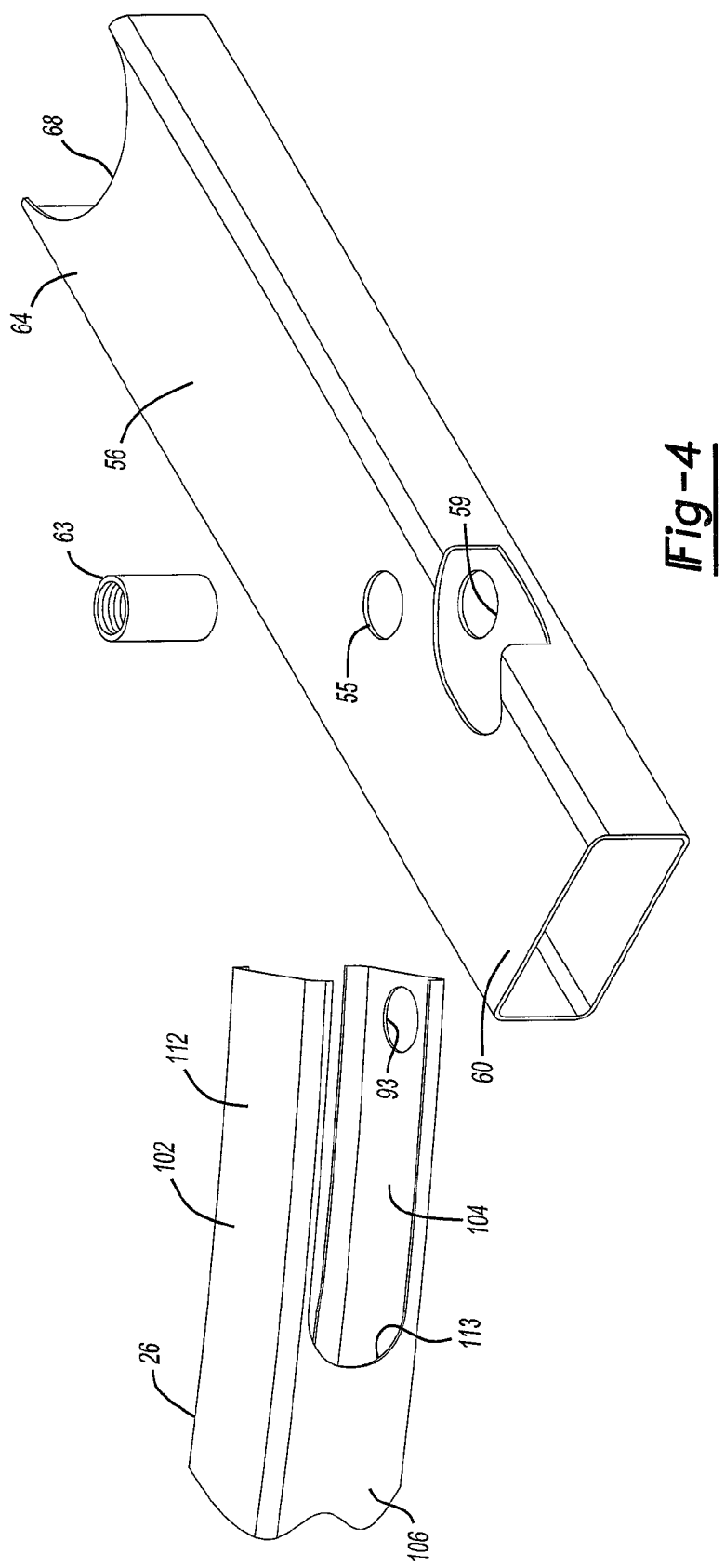
FIG. 4 is a fragmentary exploded perspective view of the truck box frame shown in FIG. 2.

Extension members 56, 58 may extend into channel 50. Extension members 56, 58 may have a cross-section generally corresponding to channel 50. In the present example, extension members 56, 58 are shown having a generally rectangular cross-section. Extension members 56, 58 may each include a first end 60, 62 and a second end 64, 66. First ends 60, 62 may extend into channel 50 and second ends 64, 66 may extend outwardly and include arcuate recesses 68, 70 for housing sleeves 38 therein. First ends 60, 62 may be fixed to front sill floor 44 by any appropriate method, such as welding. Extension members 56, 58 may each include apertures 55, 57 in top surfaces thereof and apertures 59 (shown in FIG. 4 only for extension member 56) bottom surfaces thereof. For simplicity, a detailed view of only extension member 56 is shown in FIG. 4, with the understanding that similar structure is present in extension member 58. Threaded sleeves 63 may be located in apertures 55, 57 and aperture 59. Threaded sleeves 63 may be coupled to extension members 56, 58 in a variety of ways, such as welding. As indicated above, a detailed view of extension member 56 and frame side rail 26 is shown for exemplary purposes in FIG. 4.

Figure 6:
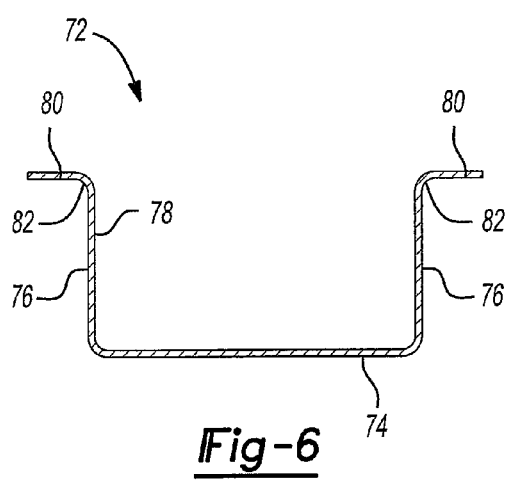
FIG. 6 is a sectional view taken at line 6-6 shown in FIG. 2.

Rear frame member 24 may be rollformed and may be generally similar to front frame member 22, extending along a width of a rear portion of truck box body 20. Rear frame member 24 may be generally parallel to front frame member 22. Rear frame member 24 may include a rear floor sill 72 having a cross-section, shown in FIG. 6, including a base 74 with upwardly extending wall members 76, forming a channel 78. Wall members 76 may include flanged upper portions 80 extending from free ends 82. Flanged upper portions 80 may be generally parallel to base 74 and may be spot welded to truck box floor 236, discussed below. Rear floor sill 72 may form a central portion of rear frame member 24.

Extension members 86, 88 may extend into channel 78. Extension members 86, 88 may have a cross-section generally corresponding to channel 78. In the present example, extension members 86, 88 are shown having a generally rectangular cross-section. Extension members 86, 88 may each include a first end 90, 92 and a second end 94, 96. First ends 90, 92 may extend into channel 78 and second ends 94, 96 may extend outwardly and include arcuate recesses 98, 100 for housing sleeves 40 therein. First ends 90, 92 may be fixed to rear floor sill 72 by any appropriate method, such as welding. Extension members 86, 88 may each include apertures 85, 87 in top surfaces thereof and apertures (not shown) in bottom surfaces thereof. While apertures are not shown in bottom surfaces of extension members 86, 88, it is understood that the apertures in bottom surfaces of extension members 86, 88 may be generally similar to aperture 59 in extension member 56 (shown in FIG. 4). Threaded sleeves 63 may be located in apertures 85, 87 and apertures (not shown) in the bottom surfaces of extension members 86, 88. Threaded sleeves 63 may be coupled to extension members 86, 88 in a variety of ways, such as welding.

Figure 7:
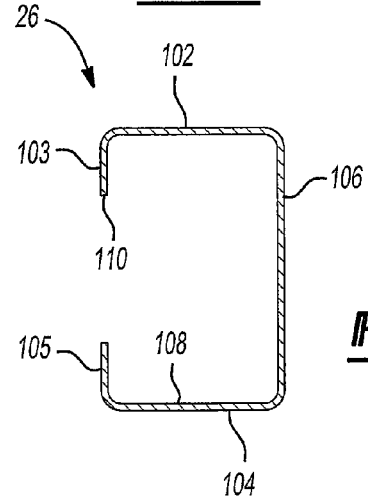
FIG. 7 is a sectional view taken at line 7-7 shown in FIG. 2.

Frame side rails 26, 28 may form a frame side rail assembly 29. Frame side rails 26, 28 may be rollformed and may generally extend between front frame member 22 and rear frame member 24, generally extending a majority of the length of truck box body 20. Frame side rails 26, 28 may have generally C-shaped cross-sections. Frame side rails 26, 28 may each be formed as generally continuous single-piece curvilinear members. Frame side rails 26, 28 may be generally similar, therefore, only the cross-section of frame side rail 26, shown in FIG. 7, will be discussed for simplicity, with the understanding that the cross-section of frame side rail 28 may generally be the same. Frame side rail 26 may include an upper portion 102 having a lip 103 extending inwardly therefrom, a lower portion 104 having a lip 105 extending inwardly therefrom, and a side portion 106 extending therebetween, generally forming a channel 108 having an opening 110. Upper portion 102 may be generally flat, providing a support surface for a truck box floor 236 (seen in FIGS. 12 and 13), discussed below. Side portion 106 may be disposed inwardly of opening 110 when frame side rail 26 is assembled with the other components of truck box frame 18, thereby facilitating spot weld gun access for welding upper portion 102 to truck box floor 236.

Frame side rails 26, 28 may each include a first end 112, 114 coupled to front frame member 22 and a second end 116, 118 coupled to rear frame member 24. More specifically, frame side rails 26, 28 may be coupled to extension members 56, 58, 86, 88. First ends 112, 114 and second ends 116, 118 may each have a section of side portion 106 removed forming recesses 113, 115, 117, 119, allowing upper and lower portions 102, 104 to extend above and below extension members 56, 58, 86, 88. Frame side rails 26, 28 may be coupled to front and rear frame members 22, 24 in any appropriate manner, such as welding. Aperture 93 (shown in FIG. 4) may be located in lower portion 104 of first end 112. A detailed view of first end 112 of frame side rail 26 is shown in FIG. 4 for exemplary purposes. For simplicity, only side rail first end 112 with aperture 93 is shown in FIG. 4, with the understanding that similar apertures may be present in first end 114 and second ends 116, 118 of frame side rails 26, 28.

Figure 8:
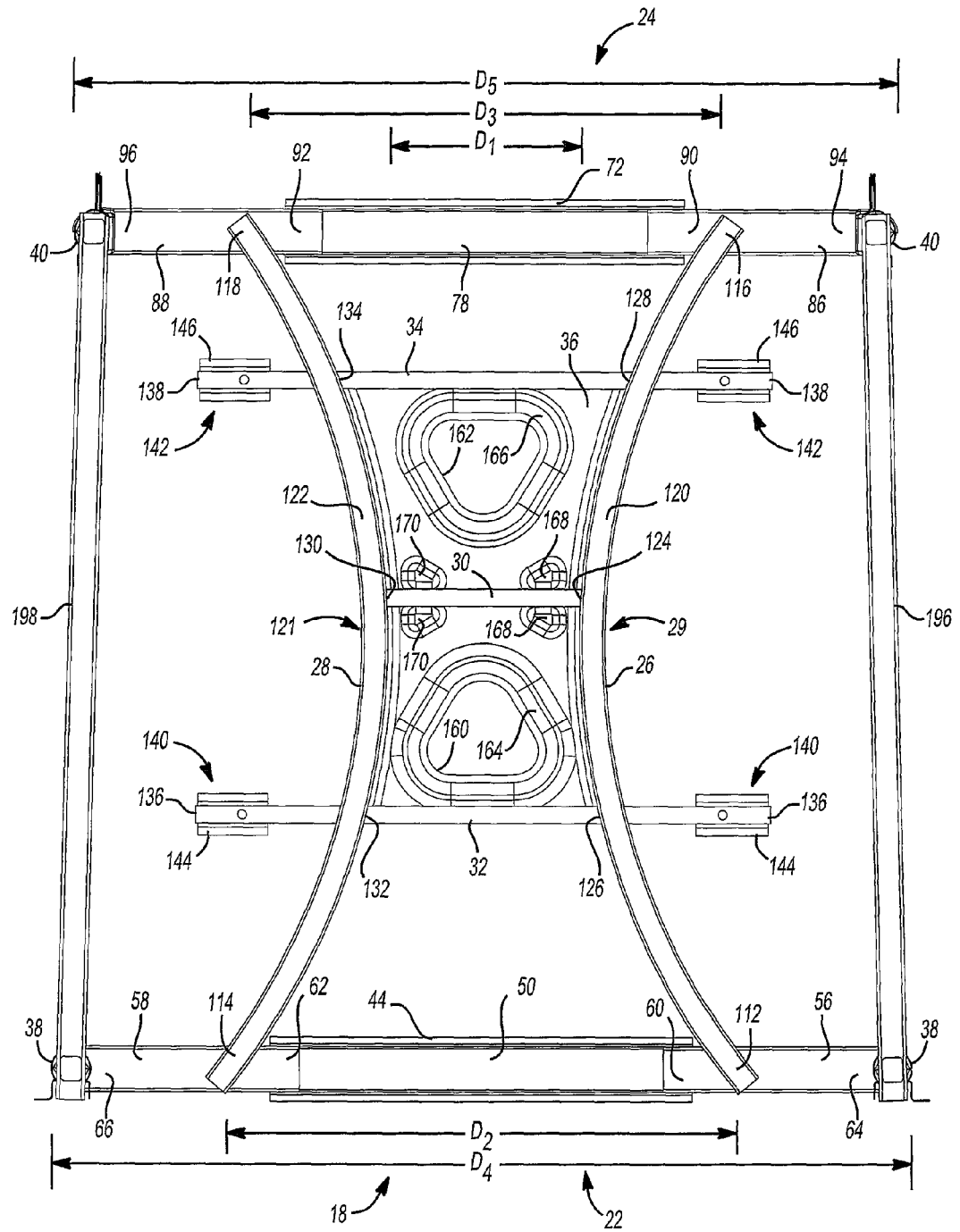
FIG. 8 is a top plan view of the truck box frame shown in FIG. 2.

Frame side rails 26, 28 may further include intermediate portions 120, 122 extending generally inwardly toward one another. Intermediate portions 120, 122 may form a tapered portion 121 of frame side rail assembly 29. With additional reference to FIG. 8, the distance (D1) between intermediate portions 120, 122 may generally form a width of tapered portion 121 and may generally be less than the distance (D2) between first ends 112, 114 and the distance (D3) between second ends 116, 118. Each of intermediate portions 120, 122 may extend inwardly relative to first ends 112, 114 or second ends 116, 118 a distance greater than five percent of the distance (D2, D3) between first ends 112, 114 or second ends 116, 118. More specifically, intermediate portions 120, 122 may each extend inwardly a distance of between ten percent and fifty percent of the distance (D2, D3) between first ends 112, 114 or second ends 116, 118. As such, the width (D1) of tapered portion 121 may generally be less than eighty percent of the distance (D2, D3) between first ends 112, 114 or second ends 116, 118. Alternatively, each of intermediate portions 120, 122 may be located inwardly of sleeves 38 or sleeves 40 a distance greater than five percent of the distance (D4, D5) between sleeves 38 or sleeves 40. More specifically, each of intermediate portions 120, 122 each may be disposed inwardly of sleeves 38 or sleeves 40 a distance of between ten percent and fifty percent of the distance (D4, D5) between sleeves 38 or sleeves 40. As such, the width (D1) of tapered portion 121 may generally be less than eighty percent of the distance (D4, D5) between sleeves 38 or sleeves 40.

Figure 9:
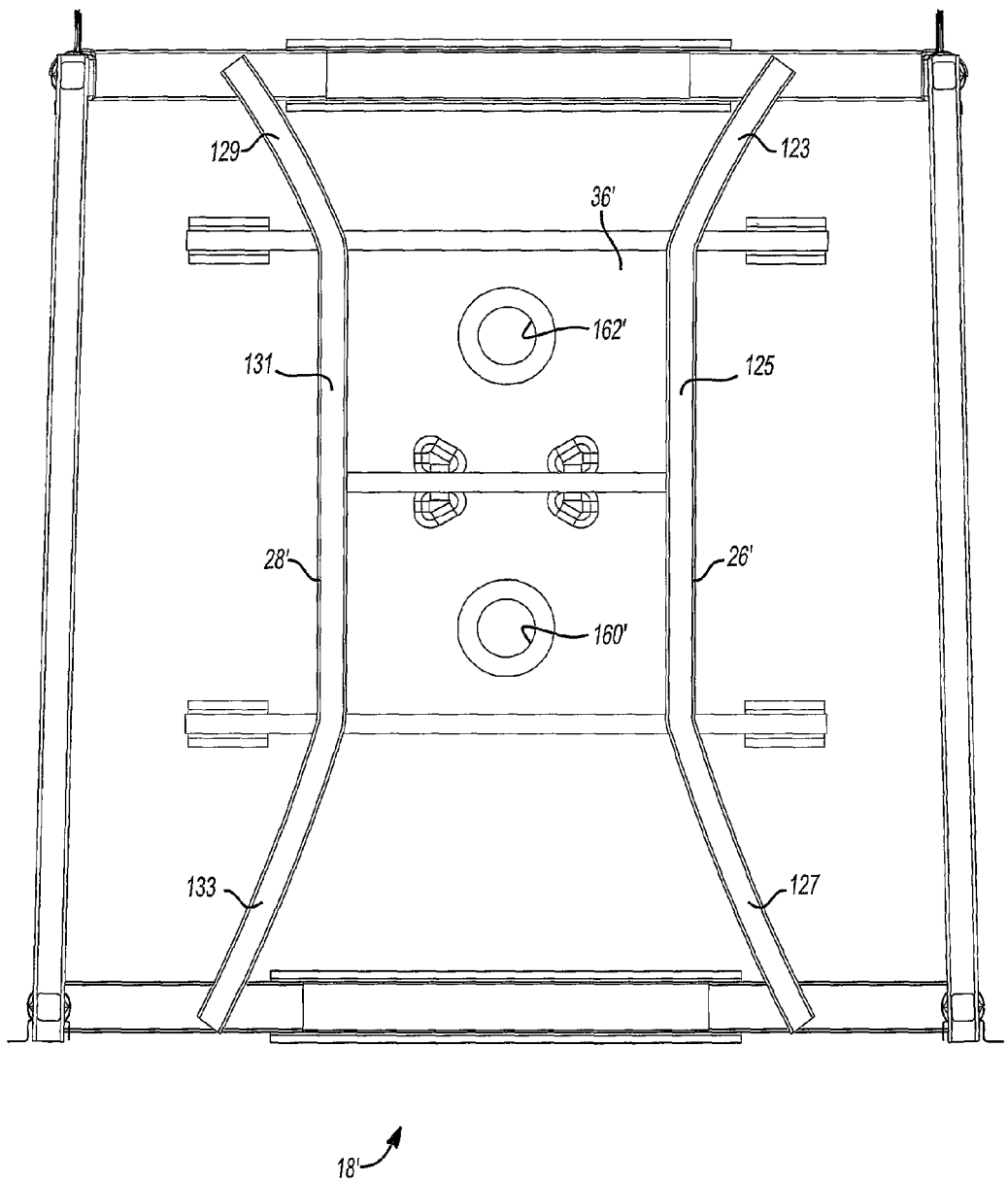
FIG. 9 is a top plan view of an alternate truck box frame.

Due to inwardly extending intermediate portions 120, 122, frame side rails 26, 28 may act as the main structural members for truck box assembly 16. As previously discussed, intermediate portions 120, 122 may have an arcuate structure, generally creating an hourglass shape for frame side rails 26, 28 when assembled. Alternatively, as seen in FIG. 9, truck box frame 18' may include frame side rails 26', 28' formed as a series of linear members 123, 125, 127, 129, 131, 133 angularly disposed relative to one another, generally creating an approximately "X-shaped" configuration for frame side rails 26', 28' when assembled. Referring back to truck box frame 18, apertures 124, 126, 128 may be located in intermediate portion 120 of frame side rail 26 and apertures 130, 132, 134 may be located in intermediate portion 122 of frame side rail 28.

Center cross-member 30 may be generally tubular, having a generally circular cross-section. Center cross-member 30 may pass through apertures 124, 130 and may be coupled to frame side rails 26, 28 in any appropriate manner, such as welding. Center cross-member 30 may extend between innermost extending portions of frame side rails 26, 28. When assembled, cross-member 30 may be located below upper portion 102 of frame side rail 26. Center cross-member 30 may be welded to reinforcement plate 36.

Front and rear cross-members 32, 34 may be generally tubular, each having a generally circular cross-section. Front and rear cross-members 32, 34 may pass through apertures 126, 132 and apertures 128, 134 and may be coupled to frame side rails 26, 28 in any appropriate manner, such as welding. Front cross-member 32 may transversely extend through frame side rails 26, 28 substantially parallel to and longitudinally between center cross-member 30 and front frame member 22. Similarly, rear cross-member 34 may transversely extend through frame side rails 26, 28 substantially parallel to and longitudinally between center cross-member 30 and rear frame member 24. When assembled, front and rear cross-members 32, 34 may be located below upper portion 102 of frame side rail 26.

Ends 136, 138 of front and rear cross-members 32, 34 may extend outwardly from frame side rails 26, 28. Mounting brackets 140, 142 may be coupled to ends 136, 138 and may include flanges 144, 146 for welding to truck box floor 236. Mounting brackets 140, 142 may be coupled to front and rear cross-members 32, 34 in any appropriate manner, such as welding. Flanges 144, 146 may be generally parallel to and co-planar with upper portion 102 of frame side rail 26. Mounting brackets 140, 142 may further may include apertures 152, 154 and nuts 156, 158 for securing truck box frame 18 to truck frame 14. Nuts 156, 158 may be coupled to mounting brackets 140, 142 in any appropriate manner, such as welding.

The design shown illustrates three cross-members 30, 32, and 34. The actual number of cross-members, locations and design of the cross-members may be predicated by the length of the truck box, box mounting locations to the truck frame 14, and stiffness/structural requirements of the box floor 236 and assembly. Cross-members and mounting brackets may be located at the box mount attachment locations or rest stops to be fastened to or supported by the truck frame 14. Alternatively, cross-member 30 may be modified to be more like cross-members 32, 34 with end mounting brackets similar to mounting brackets 140, 142. This may allow cross-member 30 to pick up additional mounting locations to truck frame 14. It may also assist in providing additional attachments to truck box floor 236 for additional structural support.

Reinforcement panel 36 may be located beneath frame side rails 26, 28 and between front and rear frame members 22, 24. More specifically, reinforcement panel 36 may be located between front and rear cross-members 32, 34. Reinforcement panel 36 may be a stamped panel and may be welded to frame side rails 26, 28 and to cross-members 30, 32, 34. Reinforcement panel 36 may generally act as a "shear plate" or "web" between frame side rails 26, 28. Reinforcement panel 36 may include openings 160, 162 having protrusions 164, 166 extending therearound and protrusions 168, 170 having center cross-member 30 passing therethrough. An alternate reinforcement panel 36' (seen in FIG. 9) may be used having a modified structure, such as the size, location and number of openings 160', 162'. These modifications may be used to tune the stiffness and structural performance of truck box frame 18 for specific applications. Protrusions 164 and 166 may also allow for welding reinforcement panel 36 to truck box floor 236.

Sleeve members 38 may be attached to second ends 64, 66 of extension members 56, 58 at arcuate recesses 68, 70, as previously noted. Attachment between extension members 56, 58 and sleeve members 38 may be achieved in any appropriate manner, such as welding. Sleeve members 38 may include generally cylindrical body portions 172 having a split 174 generally extending the length thereof. Split 174 provides greater ease of installation for pillars 42 and may also relax tolerance requirements. Alternatively, sleeve members 38 may be omitted and pillars 42 be attached directly to arcuate recesses 68, 70 using a process such as welding.

Sleeve members 40 may be attached to second ends 94, 96 of extension members 86, 88 at arcuate recesses 98, 100, as previously noted. Attachment between extension members 86, 88 and sleeve members 40 may be achieved in any appropriate manner, such as welding. Sleeve members 40 may include generally cylindrical body portions 176 having a split 178 generally extending the length thereof and a flange 180 outwardly extending therefrom. Split 178 provides greater ease of installation for pillars 42 and may also relax tolerance requirements. Flange 180 may include a series of apertures 182 and provide an additional attachment location for tailgate hinges.

Pillars 42 may be located within and coupled to sleeves 38, 40. Pillars 42 may have generally hollow cylindrical bodies and extend a height generally equal to the depth of truck box body 20. A first pair of flanges 184 may be coupled to pillars 42 extending from sleeve members 38. Flanges 184 may be coupled to pillars 42 in a variety of ways, including a welded coupling. Flanges 184 may include a series of tabs 186 extending therefrom for coupling with truck box body 20. Tabs 186 may be coupled to truck box body 20 in a variety of ways, including a welded coupling.

A second pair of flanges 188 may be coupled to pillars 42 extending from sleeve members 40. Flanges 188 may be coupled to pillars 42 in a variety of ways, including a welded coupling. Flanges 188 may include outwardly extending members 190 having upper and lower apertures 192, 194 therethrough. Lower apertures 194 may be generally aligned with apertures 182 in flange 180. Apertures 182, 194 may generally provide a mounting location between truck box body 20 and tailgate hinges. Apertures 192 may generally provide a mounting location between truck box body 20 and tailgate cables.

Stringers 196, 198 may extend between front and rear frame members 22, 24 and may be coupled to upper ends 200 of pillars 42. Stringers 196, 198 may be coupled to pillars 42 in a variety of ways, including welding. Stringers 196, 198 may be rollformed and may include rectangular openings 202, 204 (or stake pockets) into pillars 42.

Figure 10:
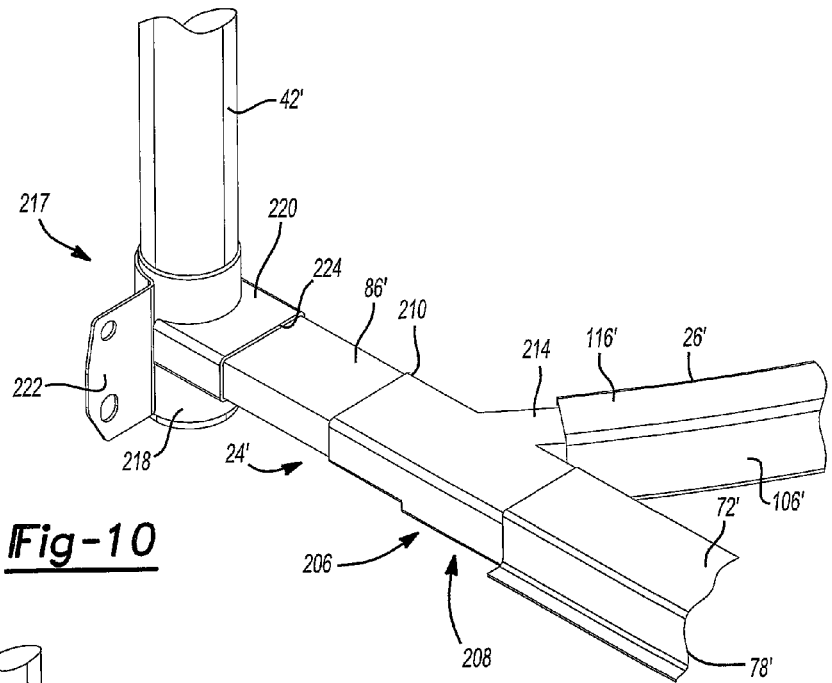
FIG. 10 is a fragmentary perspective view of an alternate truck box frame.
Figure 11:
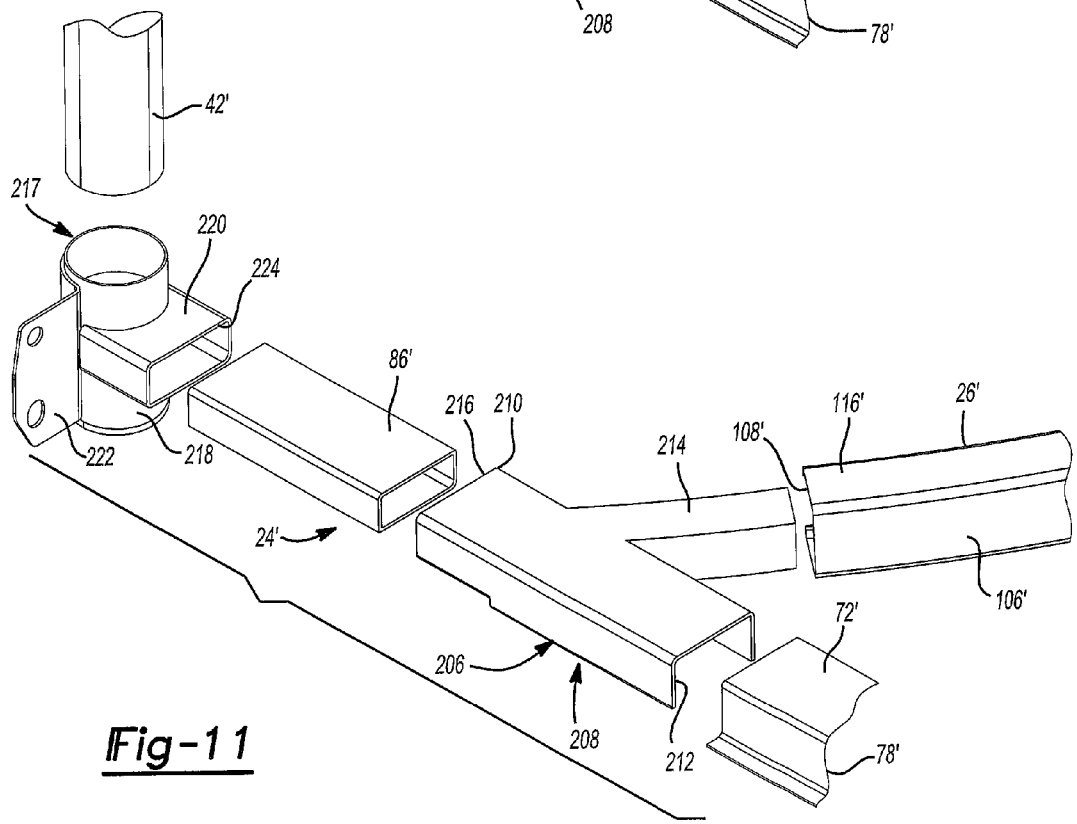
FIG. 11 is a fragmentary exploded perspective view of the truck box frame of FIG. 10.

As shown in FIGS. 10 and 11, alternate designs may include variations of front and rear frame members 22, 24 and sleeves 38, 40. In the alternate design, front frame member 22' may include a node bracket 206. Node bracket 206 will be discussed with respect to rear sill floor 72' and extension member 86'. However, it is understood that additional node brackets 206 may be disposed in various locations, such as between rear sill floor 72 and extension member 88, as well as between front sill floor 44 and extension members 56, 58, shown in FIG. 2.

Node bracket 206 may include a main body 208 having first and second ends 210, 212 and a stub arm 214 extending therefrom. First end 210 includes a generally rectangular opening 216, or pocket, receiving extension member 86' therein. Second end 212 has a generally inverted U-shaped body forming a stub arm and is received in channel 78', or pocket, of rear floor sill 72'. Stub arm 214 may generally extend at an angle inwardly from main body 208. Stub arm 214 has a generally C-shaped body corresponding to frame side rail 26' and is generally received within channel 108', or pocket, of frame side rail 26'. As such, frame side rail second end 116' may include side portion 106', rather than having it removed as discussed in the previous example.

Node bracket 206 may be a thin-walled steel casting. More specifically, node bracket 206 may have wall thicknesses of less than 3 mm. Due to this thin-walled construction, node bracket 206 may be mig welded to any or all of the rear sill floor 72', extension member 86', and frame side rail 26'. Node bracket 206 may generally provide structural reinforcement at the joint between rear sill floor 72', extension member 86', and frame side rail 26' and may provide some slip between the components during assembly.

Sleeve 217 may include a generally cylindrical body portion 218, an arm 220, and a flange 222. Sleeve 217 will be discussed with respect to rear frame member 24', with the understanding that a similar sleeve may be used with front frame member 22. More specifically, sleeve 217 may be used in place of previously discussed sleeve 40. A similar sleeve may be used in place of sleeve 38 with flange 222 being removed. Body portion 218 may be a generally continuous solid member. Arm 220 may have a generally rectangular opening 224 receiving extension member 86' therein. Flange 222 may be generally similar to flange 180 described above regarding sleeve 40.

Sleeve 217 may be a thin-walled steel casting. More specifically, sleeve 217 may have a wall thickness less than 3 mm. Due to this thin-walled construction, sleeve 217 may be mig welded to extension member 86'. Pillar 42' may be generally similar to pillar 42 and may be located within body portion 218. Pillar 42' may be retained within body portion 218 by expanding pillar 42' once located within body portion 218 through a process such as electromagnetic (EM) forming or hydraulic expansion to mechanically lock pillar 42' into sleeve 217.

Figure 12:
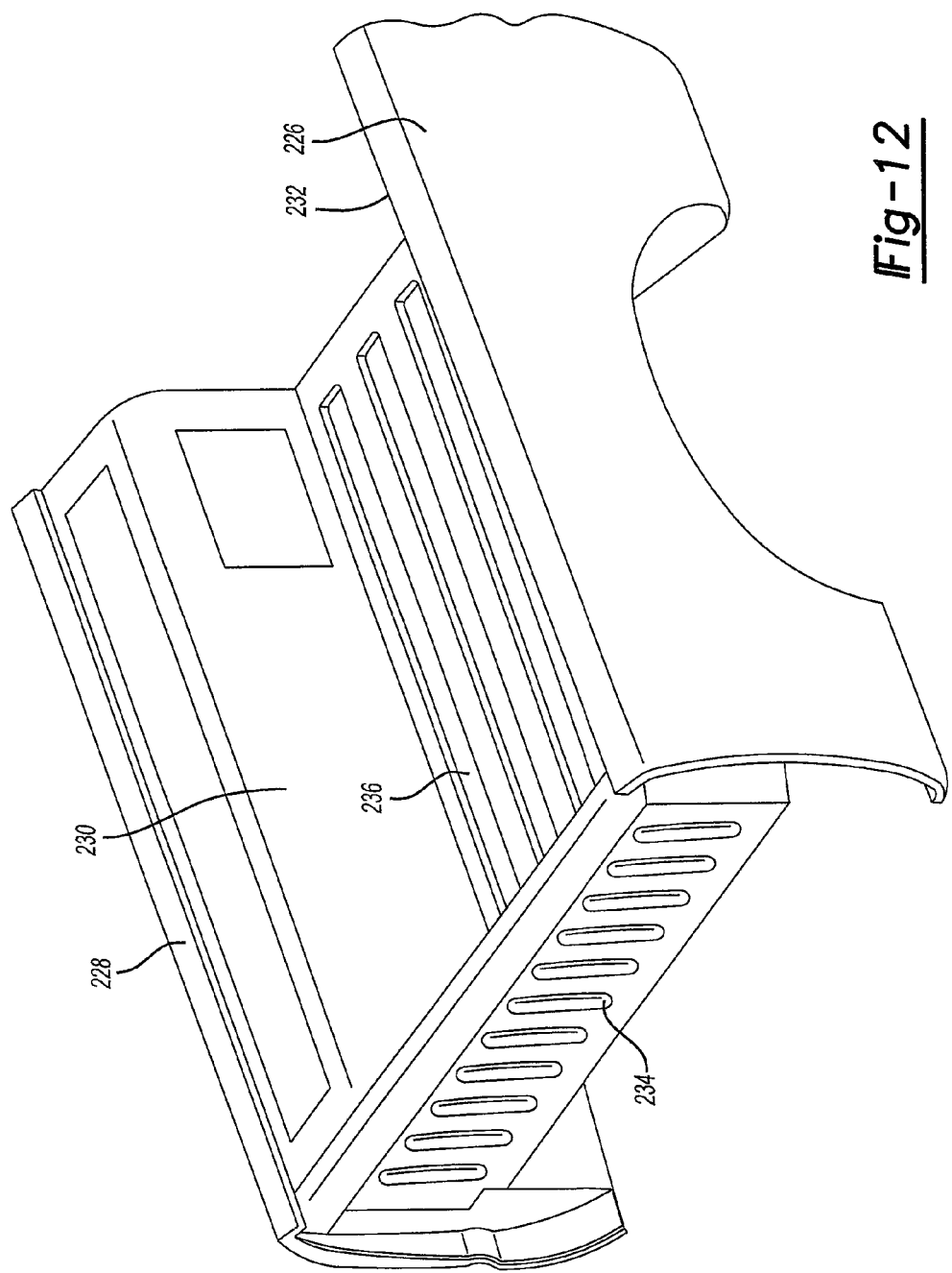
FIG. 12 is a perspective view of the truck box assembly of FIG. 1.
Figure 13:
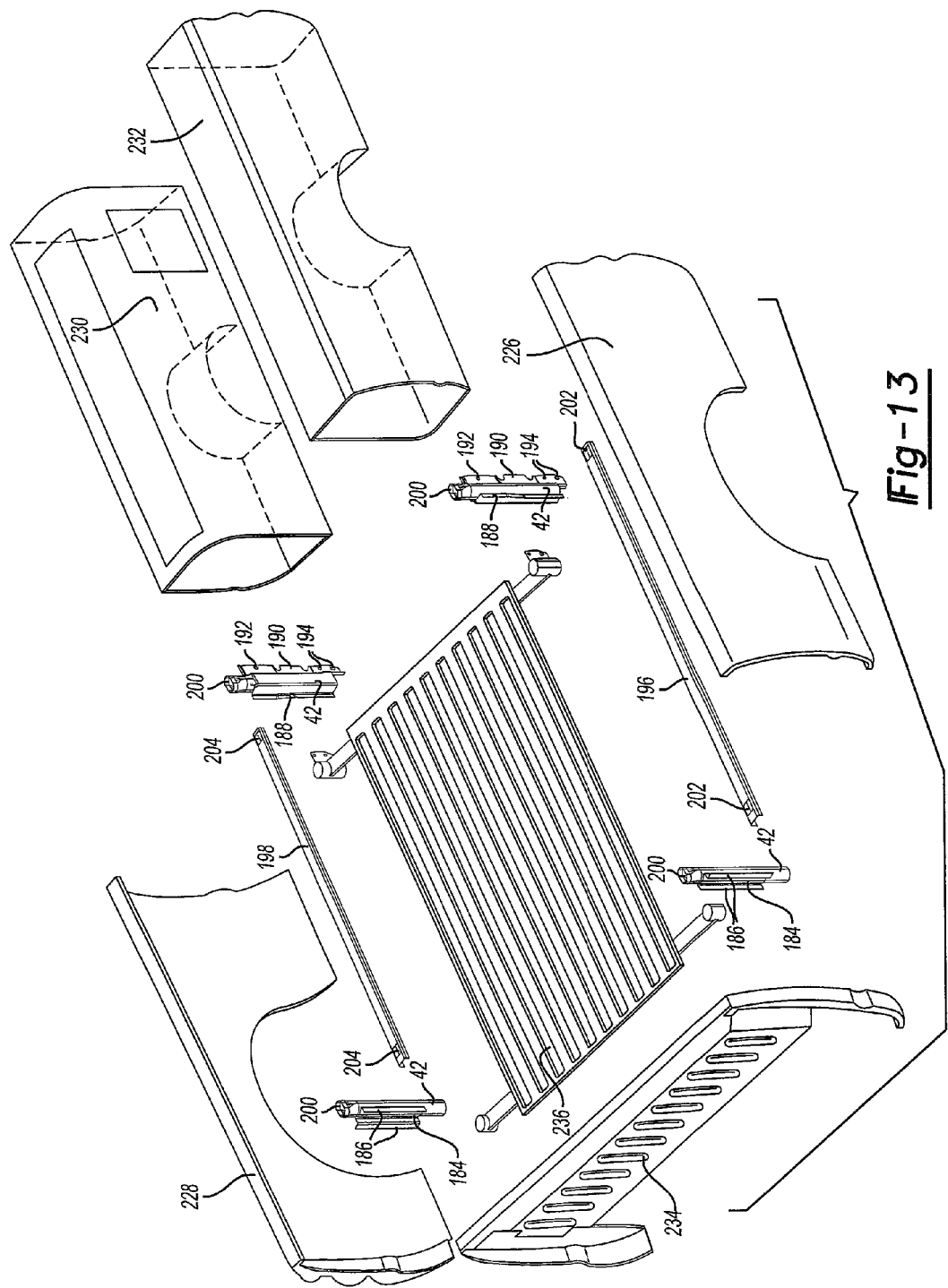
FIG. 13 is an exploded perspective view of the truck box assembly of FIG. 12.

As shown in FIGS. 12 and 13, truck box body 20 may be coupled to truck box frame 18 and may generally include left and right outer body portions 226, 228, left and right inner body portions 230, 232, a front header panel 234, and a truck box floor 236. Truck box body 20 may be coupled to truck box frame 18 in a variety of ways, including threaded fasteners and welding. Specifically, truck box floor 236 may be coupled to truck box frame 18 through a welded connection at frame side rail upper portion 102, flanged upper portions 52, 80 of front and rear frame members 22, 24 and flanges 144, 146. Header panel 234 may be coupled to truck box floor 236 and the pillar bracket tabs 186 in a variety of ways including welding or fasteners. Inner body portions 230 and 232 and outer body portions 226 and 228 may be coupled to the box structure in a variety of ways including threaded fasteners at truck box floor 236, header panel 234, stringers 196 and 198 and flanges 184 and 188.

Truck box frame 18 allows for modular assembly of truck box assembly 16. Specifically, truck box designs of different widths may be accommodated by adjusting extension members 56, 58, 86, 88 during assembly to vary the amount of overlap between extension members 56, 58, 86, 88 and front and rear sill floors 44, 72. Truck box designs of varying lengths may be accommodated by varying the length of frame side rails 26, 28. Truck box designs of different heights may be accommodated by varying the height of pillars 42. Also, the number and locations of cross-members 30, 32, 34 may be varied depending on the box length and width as well as the locations of the frame box mounts. Additionally, stiffness of truck box assembly 16 may be adjusted by modifying the inward extent of frame side rail intermediate portions 120, 122 and/or the structure of reinforcement panel 36.

The features described above provide numerous benefits. These benefits include frame side rails capable of supporting a truck bed by having a portion extending laterally inwardly. The benefits further include the ability to use common parts for different truck bed designs through the use of extendable members for varying box length, width and height. Further, stiffness may be tuned through modification of the frame side rails or the pan disposed therebetween. It is understood that any individual use or combination of the elements described above is within the scope of the disclosure.

What is claimed is:

1. A truck box frame comprising:
a laterally extending frame member located near a first end of said truck box frame, said frame member having first and second separable sections;
a frame side rail; and
a node bracket disposed between said first and second sections of said frame member, said node bracket having first, second, and third coupling portions, said first coupling portion including one of a first pocket and a first stub arm, said first separable section of said frame member including the other of said first pocket and said first stub arm, said first stub arm being positioned within said first pocket, said second coupling portion including one of a second pocket and a second stub arm, said second separable section of said frame member including the other of said second pocket and said second stub arm, said second stub arm positioned within said second pocket, said third coupling portion including a third stub arm, said frame side rail including a third pocket receiving said third stub arm therein.

2. The truck box frame of claim 1, wherein said node bracket is formed as a one-piece casting.

3. The truck box frame of claim 2, wherein said casting is a steel casting having a wall thickness less than 3 mm.

4. The truck box frame of claim 2, wherein said first section forms an end portion of said frame member and includes said first stub arm, said first coupling portion including said first pocket and receiving said first stub arm therein.

5. The truck box frame of claim 4, wherein said second section includes said second pocket, said second coupling portion including said second stub arm and extending into said second pocket.

* * * * *